Sept. 13, 1927.  
B. R. FAUNCE  
ALARM GAUGE  
Filed June 2, 1925  
1,642,413  
2 Sheets-Sheet 1
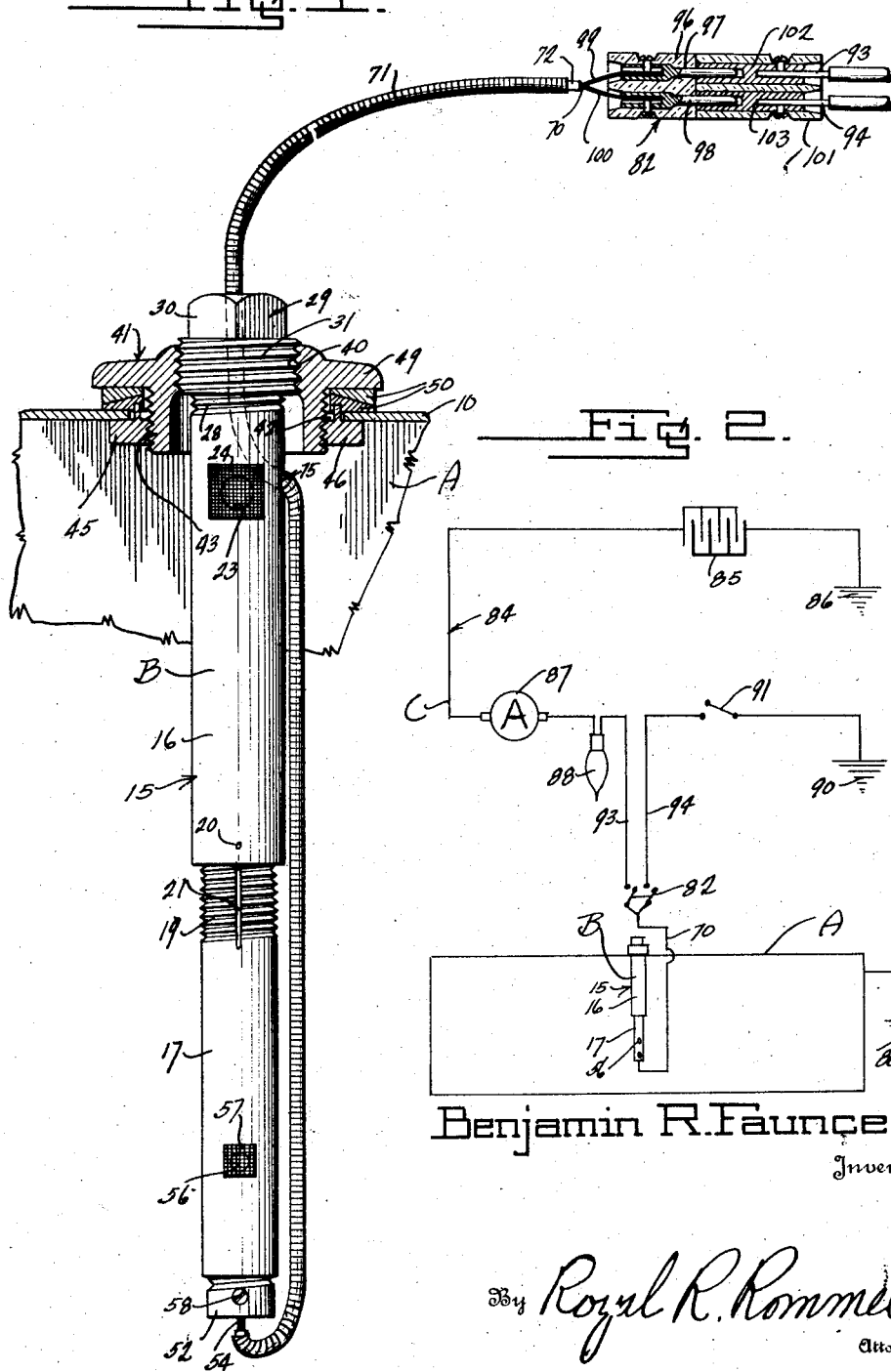
Benjamin R. Faunce.  
Inventor  
By Royal R. Rommel,  
Attorney Sept. 13, 1927.
B. R. FAUNCE
ALARM GAUGE
Filed June 2, 1925  2 Sheets-Sheet 2
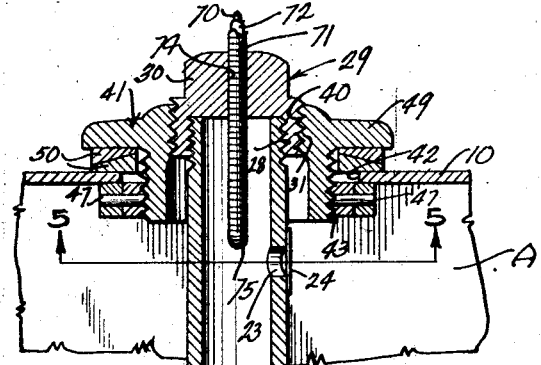
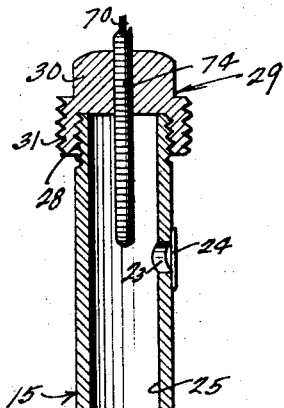
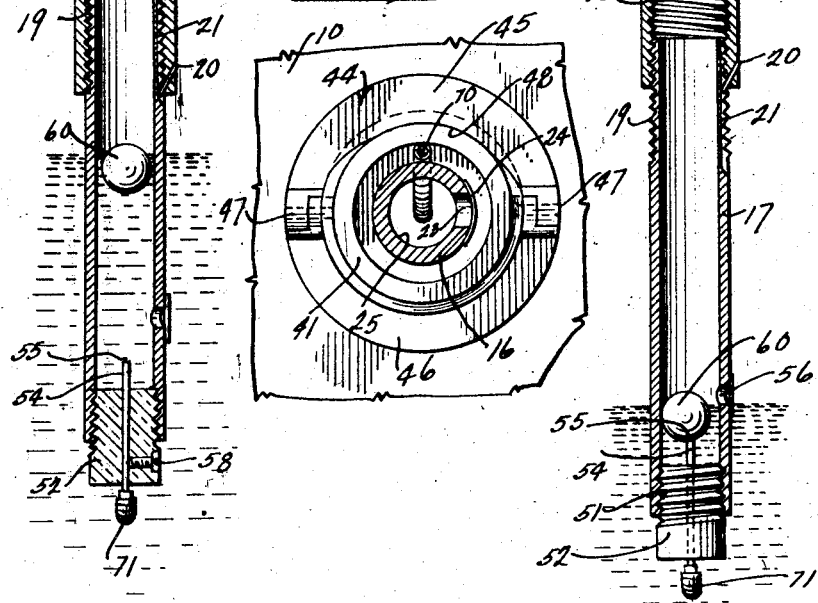
Benjamin R. Faunce.
Inventor
By Royal R. Rommel
Attorney Patented Sept. 13, 1927.

1,642,413

UNITED STATES PATENT OFFICE.

BENJAMIN RICE FAUNCE, OF RIVERSIDE, NEW JERSEY.

ALARM GAUGE.

Application filed June 2, 1925. Serial No. 34,333.

This invention relates to improvements in alarm gauges adapted for use in connection with volatile liquids, such as gasoline, to signal when the liquid level has dropped to a predetermined plane.

The primary object of this invention is the provision of a practical type of alarm gauge, embodying certain broad features of the alarm gauge set forth in my co-pending application, Serial Number 666,106, filed Oct. 2, 1923, and defining invention thereover in the novel means by which the same is assembled upon a gasoline tank to signal an alarm at a predetermined low level of gasoline therein; the improved device being of a nature so that the signalling may be effected at various levels, so that the signal will only sound at that level suited to the individual wishes of the owner of a vehicle of the tank upon which the device is installed.

A further object of this invention is the provision of a safety alarm gauge particularly well adapted for use in connection with signalling the low level of volatile liquids in a tank, and embodying a test circuit which may indicate to a person the operativeness of the electric circuit in which the alarm gauge is installed.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved gauge, showing its operating connection with a tank, and showing an improved type of safety switch which may be used for disconnecting current from the float casing when liquid is to be withdrawn from the tank before replenishing the same and after the alarm has sounded, to prevent the possibility of ignition of the vapor in the tank.

Figure 2 is a diagrammatic representation of the circuit in which the details of the alarm gauge is used.

Figure 3 is a fragmentary cross sectional view taken through a tank, and the improved float controlled alarm gauge.

Figure 4 is a longitudinal cross sectional view taken through the gauge in extended relation with respect to the view illustrated is Figure 3, and so that the alarm will be sounded at a lower liquid level than the alarm sounding which takes place with the device as illustrated in Figure 3.

Figure 5 is a cross sectional view taken substantially on the line 5—5 of Figure 3.

In the drawings, wherein for the purpose of illustration is shown only a preferred embodiment of the invention, the letter A may generally designate a fuel tank of any approved character, which is adapted to contain a volatile liquid such as gasoline. The improved alarm gauge preferably comprises the float operated circuit maker and breaker device B, adapted to be used in a novel electric circuit C.

The device B is adapted to be used in a grounded circuit, although alterations may be made to this invention to practically adapt it for use in a two-wired circuit. The device B is adapted to be mounted directly in a tank A, suspended from the top wall 10 thereof, and in contra-distinction to the invention of my co-pending application above referred to. The device B preferably comprises a housing 15, including the telescopically related tubular sections 16 and 17. The tubular section 16 is preferably of larger diameter than the section 17; and is internally screw threaded at 18, upwardly from the lower edge thereof, for adjustably receiving the externally screw threaded end 19 of the lower tubular section 17. The sections 16 and 17 are thus related so that the length thereof may be extended or shortened as desired. To hold them in a desired relation it is preferred to provide a pin or wire 20, which may be detachable, carried in radially extending relation by the section 16, which preferably projects inwardly into a longitudinal groove or way 21 which may be formed in the section 17 along its upper end, so as to prevent any circumferential movement of the sections 16 and 17 tending to displace the length to which the same has been fixed, for sounding the alarm at a predetermined low level. The section 16 adjacent its upper end is provided with a vent opening 23, preferably screened at 24, to permit venting of air out of or into the float chamber 25 in the housing 15, as the liquid thereof rises or falls. At its upper end the section 16 is preferably screw threaded, externally, at 28, for detachably receiving a cap 29. The cap 29 is provided with a wrench engaging head 30, and is externally screw threaded at 31, for detachable connection in a screw threaded opening 40 of a tank attaching plug 41.

The float housing 15 is adapted to be vertically depended into the tank compartment, and to this end the tank wall 10 is provided with an opening 42 therein, into which the externally screw threaded hollow shank 43 of the plug 41 extends. A contractible ring-shaped nut 44 is preferably adapted for use at the inside of the wall 10, and the same includes a pair of sections 45 and 46, hinged at diametrically opposed points at 47, and the same being complementary to provide the internally screw threaded opening 48 for adjustably receiving the screw threaded hollow shank 43; it being understood that the nut 45 engages at the under surface of the wall 10, and that the plug 41 is provided with an annular flange 49 adapted to clamp against thrust washers 50 placed between the flange 49 and the top surface of the tank wall 10, as is illustrated in Figure 3 of the drawings.

As to the assembling of the plug 41 in the relation shown, the nut 45 is collapsed and passed through the opening 42, and then extended, and the hollow plug 41 free of the float housing is then threaded into the nut 45, and clamped tight, and after which the float housing 15 is lowered through the screw threaded opening 40 of the plug 41, and the enlarged threaded portion 31 of the cap 30 then adjusted in the threaded opening 40, in the relation illustrated in the drawings, and thus assembling the details upon the tank.

The float housing section 17 at its lower end is internally screw threaded at 51, and is opened for detachably receiving a terminal or contact supporting insulating plug 52, which is provided with a terminal 54 extending longitudinally therethrough, and projecting into the float compartment, and being retained in a predetermined relation in said compartment, so that the top edge 55 is always in a predetermined spaced relation with respect to the liquid inlet and outlet port 56 provided in the lower end of the housing section 17, by means of a set screw 58 carried by the plug 52, as is illustrated in Figure 3 of the drawings. A screen 57 is placed over the duct 56, to prevent passage of foreign materials with respect to the float compartment 25.

A spherical float 60 is freely suspended upon the liquid in the float compartment 25, independent of any other connection at all with the housing in which it is placed, and this spherical float 60 is of a special type, as set forth in my co-pending application above referred to, preferably being electro-plated, and being true spherical and having a conducting coating of material thereabout; the specific gravity of the float being such that the same is just submerged at its maximum diameter at all times when it is freely suspended in the liquid, and as is illustrated in Figure 3. In accordance with the principle of my invention, the float 60 controls a circuit at a low level of the volatile liquid, without arcing, since all of the contact takes place below the liquid level, and thereby liability of explosions are obviated. The float 60 drops with the drop of the liquid, since the liquid level in the compartment 25 is the same as in the tank A, at all times, and preferably just at the time when the liquid is at such a low level that it can no longer pass from the compartment 25 into the tank, incident to drop of level in the latter, the float 60 will come into engagement with the tip edge 55 of the terminal 54, and be moved slightly laterally, incident to its suspended weight on the terminal 54, so that the float 60 at a point upon its maximum diameter, will engage the section 17 at its inner periphery, at a point below the liquid level; and close a circuit, since the housing 16 is grounded in a circuit, as will be subsequently described, and as is illustrated in Figure 2 of the drawings. The liquid level in the housing 25 does drop beyond the lowest liquid as permitted by the duct 56, and thus liability of arcing is obviated, as will be apparent.

It is preferred to lead a wire 70, of which the terminal 54 is a part, downwardly into the tank in a novel manner. This wire 70 is preferably protected by a flexible armored cable 71, and is insulated therefrom as at 72 in a conventional manner. The wire 70 and its armored cable 71 is led into the tank without any alteration in the structure of the tank, by passing it through an axial passageway 74 provided in the top 30 of the float housing 15, and passing the same downwardly into the float compartment 25 for a short distance, and then laterally through an opening 75, and thence downwardly parallel along the housing sections 16 and 17, and upwardly through the insulating plug 52, as is illustrated in the drawings, and as has been above described.

As to the circuit C, the same is preferably a grounded circuit, and the tank A is grounded as at 80, and which also grounds the float housing 15, which the float 60 engages to close the circuit, as above mentioned. The wire 70 of which the terminal 54 is a part, exteriorly of the tank A, is provided with a safety switch 82, by means of which the connecting wire 70 may be connected in or disconnected from a circuit 84, which may be closed independently of the circuit closing arrangement provided by the float 60, for testing purposes.

The circuit 84 includes the storage battery 85, which is grounded at 86, and at the opposite side the storage battery circuit is provided with an ammeter or other indicating instrument 87, and a signal 88, preferably visible; the ammeter 87 and signal 88 preferably being disposed in the circuit 84 between the switch 82 and the battery 85. For the circuit 84 a second ground 90 is also provided, which is normally disconnected from the switch 82, signal 88, and the ammeter 87 by means of a switch 91. In order to provide that part of the circuit in which the switch 91 is placed, two connecting wires 93 and 94 are employed, which lead to the safety switch structure 82, and are bridged only when the safety switch 82 is closed. The safety switch 82 really comprises an insulating plug 96 having a pair of terminal extensions 97 and 98 which may be connected in any suitable manner with splice portions 99 and 100 of the single conducting wire 70. The switch 82 furthermore includes an insulating socket body 101 provided with insulating socket pieces 102 and 103 therein with which the conducting wires 93 and 94 connect, so that when the switch 82 is closed, the wires 93 and 94 are in conducting relation with the wire 70, and when the switch is open the wires 93 and 94 are opened, and the line 70 is disconnected from the electric circuit. It is highly desirable for the operator to test the circuit from time to time, and to this end the switch 91 is located upon the dash, and merely by closing the same the circuit through the battery 85, ammeter 87, signal 88, switch 82, switch 91, and ground 90 will be closed, for signalling at 88 that the circuit 84 is in working order, and any defect which exists must be found in the float device B or the wire 70 thereof, thus localizing any inoperative defect. The closing of this circuit 84 independent of the device B affords a considerable satisfaction to the operator, since he can satisfy himself from time to time, when he knows that the gasoline of the tank is low, that the circuit is still in operating order and will signal at the proper time.

The safety switch 82 is very important for a number of reasons. It is placed immediately above the tank, closely adjacent the cap 30, and affords a means by which an operator may quickly disconnect the line wires when it is desired to remove the device B from the tank. It also affords a means of disconnecting the circuit when the device B is to be worked upon, so that no arcing may take place. Again, after the signal 88 has sounded that the liquid level is at the low point, if there is still sufficient liquid in the tank for the operator to run the vehicle, the operator can disconnect the switch 82, absolutely insuring that no arcing will take place at the circuit closing float 60, and the operator can continue to drive the vehicle or use the volatile liquid, with safety.

From the foregoing description of this invention it will be apparent that an improved type of alarm gauge has been provided, which is very compact in arrangement, and practical in construction, and adapted to be quickly and efficiently placed upon gasoline tanks and the like, for signalling at a low level of liquid, which low level may be selected by reason of adjustment of the tubes 16 and 17, to suit the wishes of the individual, so that a desired reserve supply of liquid may still be in the tank after the signal has sounded.

Various changes in the shape, size, and arrangement of parts may be made to the form of invention herein shown and described, without departing from the spirit of the invention or the scope of the claims.

I claim:

1. In combination with a tank having a liquid receiving compartment, an extensible casing including an upper part for attachment to the tank and extending into the compartment of the tank, and a lower part extensibly attached with the upper part and depending into the tank compartment, said lower casing part having a duct therein to permit inlet and escape of liquid with respect to said casing, a circuit controlling float in the casing adapted to rise and fall with the liquid level in the casing and tank, and terminal means in the lower end of the casing which the float is adapted to contact at a predetermined low level of liquid to close a circuit.

2. A device of the class described comprising a casing including a pair of sections connected for relative longitudinal adjustment and providing a compartment therein, said casing having a duct in the lower section to permit inlet and escape of liquid into the compartment, a float operable in said compartment incident to rise and fall of liquid level in the compartment, and terminal means in the lower end of the lower section which the float is adapted to engage and close a circuit upon drop of liquid level in the compartment to a predetermined plane.

3. A device of the class described comprising a casing including telescopic sections, means for connecting the sections in a desired longitudinally extending relation, said casing providing a compartment thru said sections, a float operating thru said compartment responsive to rise and fall of liquid level, the lower section having an opening therethrough for inlet and exit of liquid, and terminal means carried by the lower section for contact by said float at a predetermined liquid level for bridging a circuit.

4. In a float operated circuit closer the combination of a casing including a pair of tubular sections, means adjustably screw threading one section in the other, a tank adapted to receive a liquid, means for supporting one of said sections upon the tank so that the casing extends into the tank with the other section lowermost, said lowermost section having an inlet and exit opening therein, a float operable in the casing, and terminal means carried at the lower end of the lower section which the float engages to bridge a circuit at a predetermined plane of low liquid level.

5. In a float operated circuit closer the combination of a casing including a pair of tubular sections, means adjustably screw threading one section in the other, a tank adapted to receive a liquid, means for supporting one of said sections upon the tank so that the casing extends into the tank with the other section lowermost, said lowermost section having an inlet and exit opening therein, a float operable in the casing, terminal means carried at the lower end of the lower section which the float engages to bridge a circuit at a predetermined plane of low liquid level, and means for locking the sections of the casing in a predetermined adjustment so that the circuit will be bridged at a selected liquid level.

6. In a float operated circuit closer the combination with a tank adapted to receive a liquid, a housing including upper and lower telescopically connected relatively adjustable sections, means detachably connecting the upper section at its upper end in the tank so that the casing depends into the tank, said upper section having a vent duct therein, said lower section at its lower end having a liquid inlet and exit duct therein, and a float freely suspended in the casing upon liquid therein adapted when the liquid level has fallen substantially to said inlet and exit duct to bridge a circuit.

7. In a float operated circuit closer of the class described the combination with a tank adapted to receive a liquid, a housing including upper and lower sections, means connecting the sections so that they may be extended or telescoped in a desired relation, said upper section having a vent duct therein, means for connecting the upper section above the vent duct to the tank so that the housing depends into the tank, said lower section having a duct therein to permit inlet and exit of liquid with respect thereto a contact extending upwardly within the casing at the lower end of said lower section and terminating at a point below said last mentioned duct, and a circuit controlling float adapted to be freely suspended in the casing upon liquid therein so that when the liquid level has fallen substantially to said last mentioned duct the float will engage said contact at a point below the liquid level and upon further falling of the liquid level to said duct adapted to be tipped incident to the weight thereof laterally into engagement with said casing at a point below the liquid level for closing a circuit.

8. In a float operated circuit closer the combination of a housing including a pair of relatively extensible sections providing a compartment therein, one of said sections having a duct therein, a float in the compartment of said sections, and a terminal piece carried by the section in which said duct is formed extending into said compartment towards the float in a predetermined spaced relation with respect to said duct.

9. In a float operated circuit closer the combination of upper and lower relatively adjustable tubular sections providing a compartment therealong, the lower section adjacent its lower end having a duct therein, a float operable in the compartment provided by said sections, and a terminal piece extending thru the lower end of said lower section in insulated relation to said section and projecting into said compartment in facing relation with said float in a predetermined spaced relation with said duct.

10. In a float operated circuit closer of the class described a housing including a pair of telescopic sections, a detachable plug for one of said sections provided with an insulated terminal piece extending into said section, a float operable longitudinally within said sections, said section with said plug having a duct in predetermined relation with respect to said terminal, and a detachable cap at the end of the other section opposite the connection of said sections.

11. In a float operated circuit closer the combination with a tank adapted to receive a liquid including a wall having an opening therein, an elongated tubular housing having a compartment therealong, and including a cap at the upper end thereof, means for detachably connecting the cap in the opening of the wall of said tank, a float operating longitudinally in the compartment of said tubular housing, said housing having vent and inlet and outlet ducts therein, and a conducting wire extending from exteriorly of the tank directly through the cap into the adjacent end of the compartment in the tubular housing, said housing adjacent the cap and below the wall of the tank having a lateral opening thru which said conducting wire extends to exteriorly of the tubular housing, said wire extending along the tubular housing towards the end of the same opposite the cap, and insulating means at said end of the tubular housing opposite the cap end receiving the conducting wire therein to provide a portion of the wire facing in the end of the compartment of said housing opposite the cap in a contact relation with the float when the latter falls to a predetermined low level.

12. In a float operated circuit closer the combination of a tubular housing providing a compartment therein, a detachable cap at the upper end of said housing, a detachable insulating plug at the lower end of said housing, a float operating in said housing, said housing having a vent duct therein and a liquid inlet and exit duct in predetermined relation with respect to said insulating plug at the lower end of said housing, and a conducting wire entering the housing substantially axially thru said cap and below said cap extending exteriorly of the housing longitudinally thereof to said insulating plug, and providing a terminal extending thru said insulating plug in projecting relation into the compartment of the housing in predetermined spaced relation with respect to the inlet and outlet duct of said housing, and a circuit bridging float in the compartment of the housing adapted at a predetermined low liquid level as permitted by said inlet and exit duct to engage said terminal and tip laterally into circuit bridging relation with said housing.

13. In combination with a tank having a liquid receiving compartment therein, an elongated casing connected with the tank and depending into said compartment and including means to extend the length thereof within said compartment, said casing having a duct therein in the lower portion to permit inlet and escape of liquid with respect to said casing, a circuit controlling float in the casing, and terminal means in the lower end of the casing adjacent said duct for movement with the casing when the latter is moved into any extended relation in the tank compartment, said float being adapted to engage said terminal means to close a circuit when the liquid level in the tank drops to the duct.

BENJAMIN R. FAUNCE.